INVENTOR
HERBERT M. REEVES

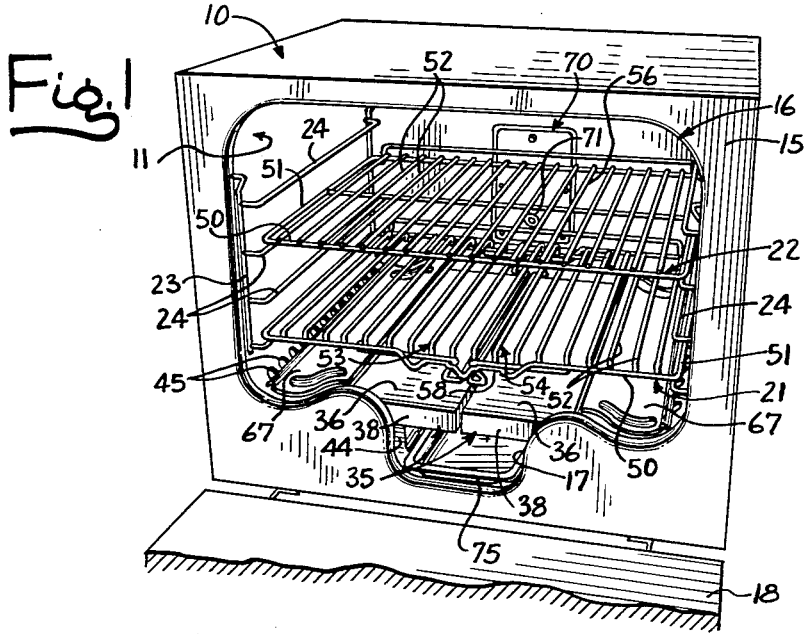
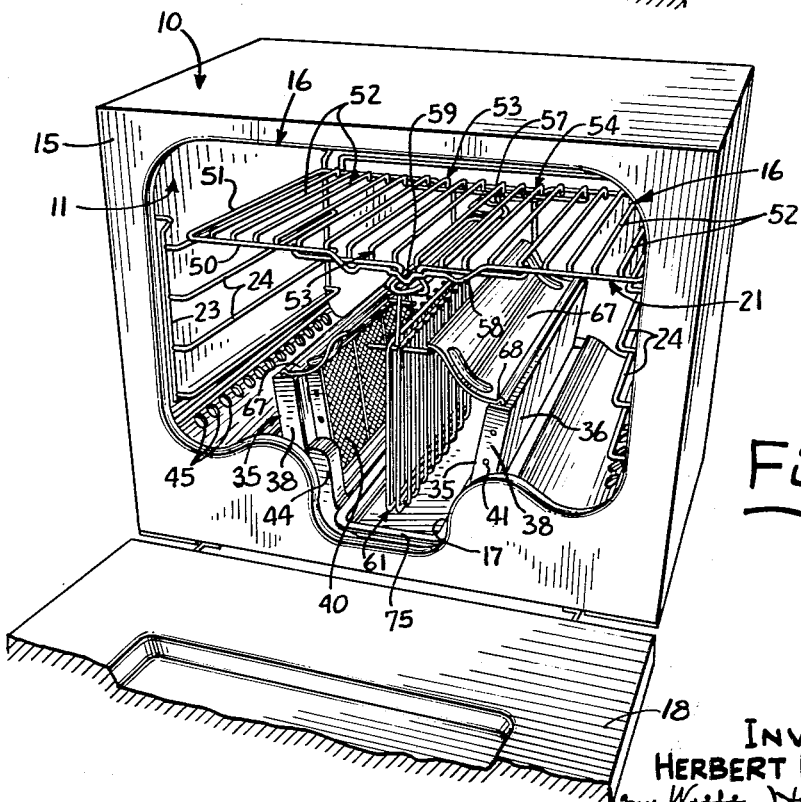

United States Patent Office 3,122,134
Patented Feb. 25, 1964

3,122,134
GAS HEATED OVEN CONSTRUCTION
Herbert M. Reeves, Kankakee, Ill., assignor to Geo. D.
Roper Corporation, Kankakee, Ill., a corporation of
Massachusetts
Filed May 3, 1961, Ser. No. 107,563
4 Claims. (Cl. 126—41)

The invention relates generally to gas heated home cooking appliances and more particularly to gas heated ovens.

Cooking processes of the type commonly known as baking and roasting are best performed with the oven chamber containing the food heated indirectly—that is, by conduction or convection or both. Cooking processes of the type commonly known as broiling, on the other hand, involve the exposure of the food to radiant heat, which may be derived directly from a burner or from an element heated to a radiating temperature by the burner. Because of the diverse requirements of the different cooking processes, it has been the usual practice heretofore to construct gas heated cooking appliances with separate baking and broiling ovens, each having its own individual burner.

One object of the invention is to provide a gas heated oven in which baking, roasting and broiling can all be performed efficiently and satisfactorily in a single compartment equipped with but one burner, thereby greatly simplifying the construction of the oven and materially reducing its cost.

More specifically stated, it is an object of the invention to provide a gas heated oven which is universally adaptable for baking, roasting, broiling and rotisserie cooking.

Another object is to provide a gas heated oven in which cooking processes heretofore requiring separate burners can be performed efficiently and satisfactorily with a single burner.

It is also an object of the invention to provide a gas heated oven capable of performing all of the various oven cooking processes with a high degree of efficiency.

Other objects and advantages of the invention will become apparent from the following detailed description of the preferred embodiment illustrated in the accompanying drawings, in which FIGURE 1 is a front view of a gas heated oven unit embodying the features of the invention, the oven being shown conditioned for baking or roasting.

FIG. 2 is a front view of the oven unit shown in FIG. 1 with the oven conditioned for broiling.

For purposes of illustration the improved oven has been shown in the form of a unit adapted to be installed in a cabinet or the wall structure of a kitchen. It will be understood, of course, that the oven may be incorporated in a conventional gas range if desired, in which case it may be located either below the top burner, as in table top ranges, or at the level of or substantially above the top burner as in high oven ranges.

Figure 4:
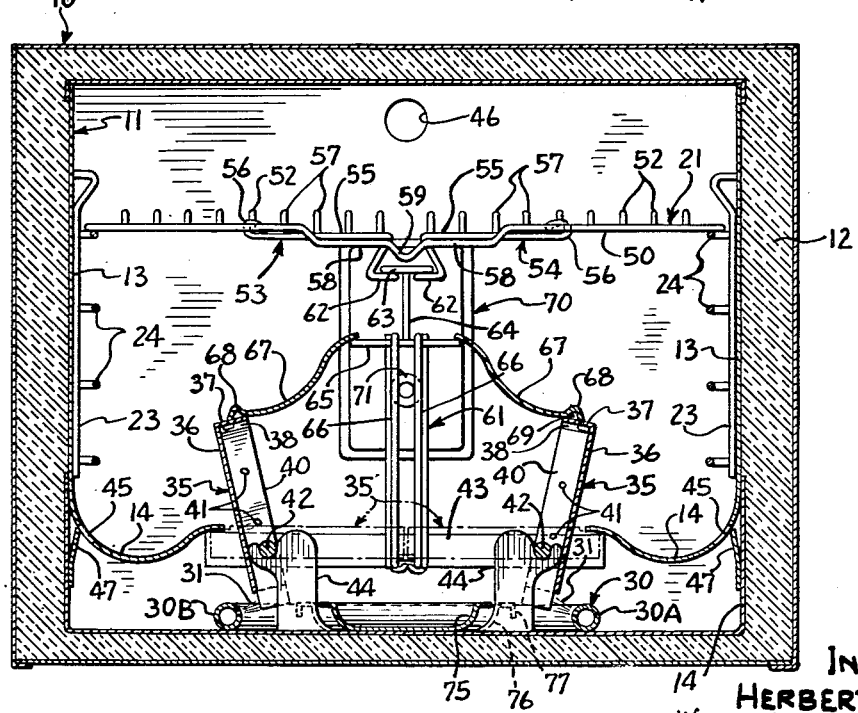
FIG. 4 is a transverse sectional view through the oven unit taken in a vertical plane with the oven conditioned for broiling as shown in FIG. 2.

Referring to the drawings, the exemplary oven structure comprises generally rectangular outer and inner shells 10 and 11, both of which are usually of sheet metal construction. The inner shell thus defines a rectangular chamber which constitutes the cooking space. As shown in FIG. 4, the shells are dimensioned so that when assembled their walls are spaced a substantial distance apart and this space is filled with suitable insulating material 12 to minimize transmission of heat to the outer shell.

In the particular structure illustrated, the inner shell 11 is formed in upper and lower sections with the upper sections telescopingly fitted into the lower section. The upper section has appropriate side walls 13 with their lower edge portions 14 extended and turned inwardly to form elements of a partitioning structure dividing the oven into upper and lower compartments for purposes to appear presently.

Both of the shells 10 and 11 may be formed with openings in their front walls or such walls may be omitted to provide an access opening to the oven chamber. The insulation filled space between the two shells is desirably closed off by a front panel 15 formed with an opening 16 affording access to the oven chamber defined by the inner shell. In the exemplary oven, the opening 16 is shaped to substantially completely frame the upper chamber above referred to, while the lower central portion of the panel is cut away as at 17 to extend the opening substantially to the bottom of the chamber. A door 18 hinged at its lower edge to the oven structure is provided for closing the access opening when the oven is in operation.

Suitable ledges are provided on the side walls 13 of the oven compartment by which shelves or racks 21, 22 may be supported at various selected levels. The ledges as shown are formed by spaced vertical uprights 23 joined by cross bars 24. The latter have their ends bent over so as to locate the bars outwardly of the oven wall in position to receive and support a shelf or rack. The uprights 23 may be secured to the side walls of the oven chamber, that is, to the walls 13 in any preferred manner so as to retain the cross bars 24 in a horizontal position with corresponding cross bars at opposite sides of the oven disposed in the same horizontal plane.

Heat is supplied to the oven chamber by a gas burner 30 (FIG. 4) which may be of conventional U-shaped construction supplied with gas through the usual valved gas line. The burner is preferably located on or relatively close to the bottom of the oven chamber with its two legs 30A and 30B extending fore-and-aft of the chamber and substantially equally spaced from the center line of the chamber. As shown in FIG. 4, the burner legs are located approximately midway between the center line of the chamber and the adjacent side walls. Preferably, they are formed with flame ports positioned to direct the flames generally inwardly and upwardly as indicated at 31.

In accordance with the invention the improved oven is constructed in a novel manner which permits the different cooking processes above mentioned to be carried out efficiently in the same compartment and with the single burner 30 as the source of heat. For that purpose the oven is provided with a partitioning structure including the extended lower end portions of the side walls 13 and a pair of movable members 35 operative in one position to divide the single oven chamber within the shell 11 into separate burner and oven compartments as shown in FIG. 1 and thus condition the oven for baking or roasting. Members 35 in their alternate position are effective to extend the central portion of the oven compartment substantially to the bottom of the oven chamber as shown in FIGS. 2–4 and thereby condition it for broiling or rotisserie cooking.

Figure 3:
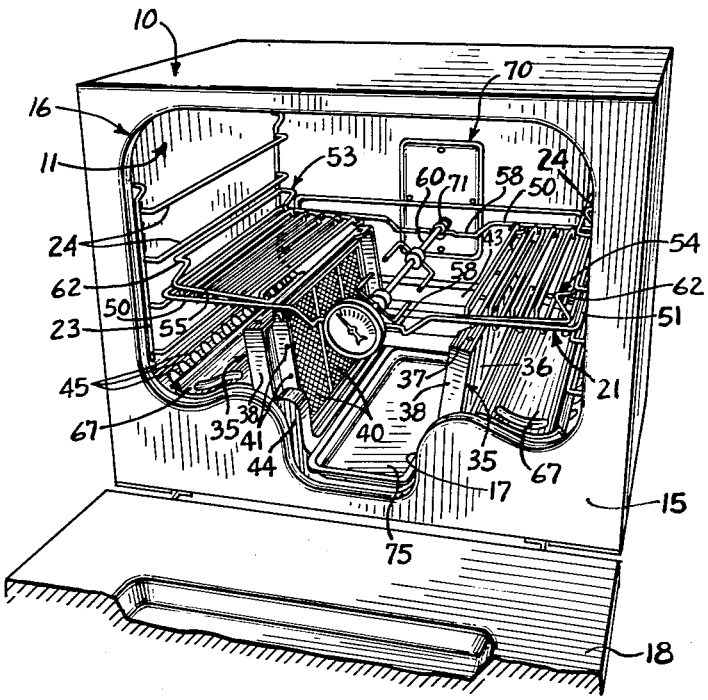
FIG. 3 is a front view of the oven unit shown in the preceding figures with the oven conditioned for rotisserie cooking.

Referring more particularly to FIGS. 3 and 4 of the drawings, the members 35 are alike, each comprising a generally rectangular metal sheet 36 having one side edge portion bent over to form a flange 37 and the edge portions at both ends bent over to form flanges 38. The member thus presents the appearance of a relatively shallow rectangular pan with one side wall lacking. Fitted within the pan-like structure are a plurality of radiant heating elements 40 (FIGS. 2 and 3). The elements 40 comprise rectangular blocks of ceramic or other suitable material adapted to glow and radiate heat when heated by a gas flame. Suitable fastening elements such as pins 41 hold the elements in assembled relation with the members 35.

When assembled in the oven structure the members 35 are supported at opposite ends by pivot pins 42 which may be in the form of elongated bars extending through opposite end flanges 38 of the member or may comprise the short studs welded or otherwise fixed to the flanges. In either case, the projecting ends of the pivot pins are adapted to engage in sockets provided for their support on the oven structure. The sockets adjacent the inner wall of the oven may be conveniently carried by a cross member 43 welded or otherwise secured to the back wall of the oven chamber. At the front of the chamber, the pins 42 engage in upwardly opening grooves or sockets presented by pedestals 44 secured to the bottom of the oven chamber adjacent the inner face of the front panel 15.

The pivot pins 42 are located on the members 35 and their sockets are positioned so that when swung into horizontal position as shown in FIG. 1, the flanged edges 37 of the members meet substantially at the center line of the oven chamber. The width of the members is such that in the horizontal position they completely close off the space between the partitioning elements 14 which, in this instance, equals substantially half of the bottom area of the compartment. Preferably the members 35 are dimensioned so that in the horizontal position their outer edges underlie the adjacent edge portions of the elements 14 which thus serve as stops to define the limit positions of the members.

As shown in FIGS. 2 and 4, the partitioning elements 14 are shaped to form shallow rounded channels to facilitate collection and removal of spillage from cooking operations. Each element is perforated by a row of holes 45 to permit the passage of gaseous products of combustion from the lower compartment to the upper or oven compartment. Such gases are vented from the oven compartment through the usual vent opening 46 (FIG. 4) in the back wall of the oven which opens into a suitable flue. Deflector plates 47 secured to the side walls of the shell below the elements 14 direct the flow of gases through the openings 45.

To facilitate the conditioning of the oven for different types of cookery, the rack 21 is constructed in a novel manner to adapt it for supporting any of the different types of utensils that may be required. The rack 21 as shown comprises elongated transverse members 50 of heavy wire or thin metal rods connected by side members 51. It will be understood that the transverse and side members may be integral if desired, that is, they may be formed from a single piece of wire or bar stock bent into rectangular configuration. The rack, of course, is dimensioned in width so that it can rest on the ledges defined by the cross bars 24 on the side walls of the oven chamber. The depth of the rack is preferably slightly less than the depth of the oven compartment.

Extending between and welded to the transverse members 50 at opposite sides of the rack are a plurality of cross bars 52 defining a pair of fixed sections or main food supports of limited area. In the particular rack shown, each fixed section of the rack extends over approximately one-fourth of the rack area leaving a space of approximately one-half of the over-all rack area open between them. Auxiliary rack sections or supports 53 and 54 are provided for closing the intervening space when the entire rack area is required for supporting cooking utensils such as baking or roasting pans. In order to clear the space and afford clearance for rotisserie cooking, the auxiliary racks are assembled with the main rack structure for movement, in this instance by swinging, between operating and retracted positions shown respectively in FIGS. 2 and 3.

In the preferred form shown, the auxiliary racks 53 and 54 each comprises a U-shaped wire frame having the free ends of its legs 55 curled as at 56 (FIG. 4) to embrace the inner cross bar 52 of the rack and thus form a hinge about which the auxiliary rack may swing. Spaced parallel, cross members 57 extend between the legs 55 and present supporting surfaces in the same plane as the cross bars 52 when the auxiliary racks are in the horizontal operating position shown in FIG. 4.

In the exemplary rack, the transverse members 50 are formed to provide supports for the auxiliary racks in operating position. For this purpose the center portion of each transverse member is offset downwardly and inwardly as at 58 so as to underlie the auxiliary rack leg 55 when the latter is swung to the operating position. Between the two supports thus provided, each transverse member has its central section formed with a downwardly directed bend 59 defining an upwardly open bearing for a rotary spit 60 as will be explained in more detail later on.

The auxiliary racks 53 and 54 are designed to perform an additional function, namely to support a broiling rack 61 such as that shown in FIGS. 2 and 4. For this purpose the inner ends of the legs 55 are bent into a Z-shaped form to define spaced ledges 62 from which the broiler rack may be suspended. The broiler rack as shown is provided with a suspension member 63 which is of sufficient width to extend over and rest on the ledges 62 as shown in FIG. 4. While this member may be of any preferred construction it is shown herein as comprising a heavy wire bent into an elongated, narrow loop and having hangers 64 depending at opposite ends. At the lower ends, the hangers are provided with rigid cross arms 65 to which the hinged sections 66 of a conventional broiling rack may be suspended. Broiling racks of this type are adapted to retain food items at a generally upright position by clamping them between the two sections.

For broiling operations, the bottom partitioning members 35 are swung to an upright position as previously explained thus presenting the radiant elements 40 in a position to direct radiant heat generally inwardly of the oven compartment. The rack 61 carrying the food to be broiled may then be inserted by simply sliding the member 63 endwise between the ends of the auxiliary racks and over the ledges 62. With the rack 21 supported on the uppermost cross bars 24, the rack 61 will then depend substantially midway between the two radiant elements. Accordingly foods supported by the rack 61 will receive radiant heat directly from the elements.

To minimize loss of heat into the oven compartment, the space between the broiling rack 61 and the partitioning members 35 is temporarily closed off by a pair of sheet metal shields 67 bridged between the upper ends of the members 35 and the cross arms 65 of the rack hanger. The shields may be held in place in any convenient manner, as for example by a detent formed by a downwardly faced longitudinal groove 68 in the lower edge of the shield and cooperating bosses 69 upstanding from the side flanges of the members 35. In the particular embodiment shown the shields 67 are shaped to nest with the partitioning elements 14 when the broiler is not in use.

To provide for rotisserie cookery, oven units are commonly equipped with motor driven mechanisms for rotating a spit. A conventional mechanism of that type, indicated at 70 in FIG. 3, is mounted on the back wall of the exemplary oven structure with its spit receiving socket 71 projecting into the compartment. Spit supporting bearings 59 on the rack 21 are alined with the socket 71 to rotatably support the spit with its inner end inserted in and drivingly coupled to the socket. For rotisserie cookery, the auxiliary rack sections 53 and 54 are folded back as shown in FIG. 3 to rest on the fixed end sections. The space at the central portion of the main rack is thus cleared to afford room for food items carried by the spit. Partitioning members 35 are preferably swung into upright position as shown to direct radiant heat onto the spit supported food item.

A drip pan 75 of suitable shape and dimensions is provided for catching grease or other liquids dripping from food items being broiled or cooked on the spit 60. As shown in FIGS. 3 and 4 the drip pan is relatively shallow and is dimensioned so that it can be inserted between the pedestals 44 and the legs 30A and 30B of the burner. To facilitate locating the pan centrally within the burner compartment, a shallow trough shaped liner 76 may be installed between the pedestals 44 extending to the rear of the oven chamber. The liner, as shown in FIG. 4, has upstanding side edge portions terminating in outwardly and downwardly bent flanges 77 adapted to cooperate with the lower edges of the partitioning members 35 in isolating the burner compartment from the cooking compartment when the partitioning members are in their raised positions.

It will be apparent from the foregoing that the improved oven is adaptable for any type of cookery commonly performed in a closed chamber. To condition the oven for baking or roasting as shown in FIG. 1, it is only necessary to swing the partitioning members 35 to their closed or horizontal positions. The partitioning members then divide the oven chamber into superimposed cooking and burner compartments. The limit positions of the partitioning members are defined by the inner edge portions of the members abutting the edge portions of the partitioning elements 14. With the members so positioned the radiant elements 40 present their lower surfaces to the flame of the burner 30 and transfer the heat to the oven compartment mainly by conduction. Gaseous products of combustion pass upwardly from the burner compartment through the holes 45 in the partitioning elements and out through the vent 46 serving to transfer heat to the oven compartment by convection.

Racks 21 and 22 are placed on appropriate pairs of the cross bars 24 as determined by the particular food items to be cooked. The auxiliary rack sections 53 and 54 are swung to their operating positions thus adapting the entire rack area for supporting cooking utensils such as baking or roasting pans. The baking or roasting operation may then proceed in the conventional manner.

When the oven chamber is to be used for broiling, the partitioning members 35 are swung to the open or upright position shown in FIG. 2. In those positions the projecting edges of the radiant elements 40 are positioned so that the flames from the burner 30 impinge on their exposed lower end surfaces. The elements are thus heated to a relatively high temperature and radiate heat inwardly and upwardly from their exposed inner faces.

The food items to be broiled are supported in the path of the radiant heat by a suitable utensil such as a broiling rack 61. The rack may be conveniently suspended from the ledges presented by the bent inner ends of the auxiliary racks 53 and 54 which of course, are swung into the same positions as for baking or roasting. Only one of the racks will be required for broiling, namely the upper rack 21 and it will be supported on the uppermost cross bars 24. The other rack 22 is simply removed from the oven.

To conserve heat, the shields 67 may be removed from their nesting relation with the partitioning elements 14 and placed in bridging relation between the upper edges of the members 35 and the cross bars 65 of the broiler rack hanger. The shields are thus effective to reflect heat back to the food item carried by the rack 61 which is suspended substantially midway between the elements 40.

Partitioning members 35 in their upright positions extend the central portion of the oven chamber downwardly substantially to the bottom of the burner compartment affording ample clearance for the broiler rack which may thus hang down well below the normal baking oven bottom level. The lower edges of the partitioning members cooperate with the flanges 77 of the liner 76 to isolate the burner compartment from the upper or cooking compartment. Products of combustion pass upwardly through the holes 45 in the partitioning elements and are exhausted through the vent 46 as in the case of baking and roasting.

For rotisserie cooking, the partitioning members 35 are swung to the upright position as for broiling. Auxiliary sections 53 and 54 of the rack 21 however, are swung out to the retracted position shown in FIG. 3. This leaves the central portion of the rack open so that the spit 60 and its load of food may be supported in position for cooking. The inner end of the spit is inserted in the socket 71 and the spit is supported in the bearings 59 provided on the transverse members of the rack.

It will be apparent from the foregoing that the invention provides an oven of novel and advantageous construction characterized particularly by its universal adaptability for all types of cooking commonly performed in an enclosed chamber. Only a single gas burner is required for supplying heat and, by reason of the novel partitioning structure provided by the invention, the oven can be quickly and easily conditioned for efficient baking, roasting, broiling or rotisserie cooking. The elimination of the separate burner conventionally required for broiling substantially simplifies the controls required for the oven and reduces costs materially.

I claim as my invention:

1. A gas heated oven structure comprising, in combination, means defining a generally rectangular chamber having an access opening in its front wall, a partitioning structure extending transversely across said chamber dividing it into upper and lower compartments, means in the upper compartment for supporting food carrying racks, a gas burner disposed in the lower compartment having two legs extending fore-and-aft of the lower compartment and disposed at opposite sides of the center line of that compartment, said partitioning structure including a pair of centrally disposed members respectively overlying the two burner legs and normally operative to separate the upper and lower compartments, and means supporting said members for pivotal movements about fore-and-aft axes to positions effective to open the upper compartment to the lower compartment with the members interposed between the upper compartment and the respective burner legs.

2. A gas heated oven structure comprising, in combination, means defining a generally rectangular chamber having an access opening in its front wall, a partitioning structure extending transversely across said chamber dividing it into upper and lower compartments, means in the upper compartment for supporting food carrying racks, a gas burner disposed in the lower compartment having two legs extending fore-and-aft of the lower compartment and disposed at opposite sides of the center line of that compartment, said partitioning structure including a pair of centrally disposed members respectively overlying the two burner legs and normally operative to separate the upper and lower compartments, radiant elements carried by said members and presented to face the burner legs with the members in said compartment separating positions, and means supporting said members for pivotal movement into a position to open the upper compartment to the lower compartment and to present said radiant elements in position to receive heat from the respective burner legs and to direct radiant heat into the upper compartment.

3. A gas heated oven structure comprising, in combination, a sheet metal shell defining a generally rectangular chamber having an access opening in its front wall, means on the side walls of the chamber defining paired ledges for supporting food carrying racks, a gas burner disposed at the bottom of the chamber presenting two legs extending fore-and-aft through the chamber and spaced apart laterally a substantial distance, a partitioning structure extending transversely across said chamber above said burner to divide the chamber into an oven compartment and a burner compartment, said partitioning structure including a pair of members of substantial width located centrally of the structure and extending fore-and-aft of the oven compartment, and pivot means supporting said members to swing about axes spaced from their adjacent edges between a horizontal position effective to close off the burner compartment from the oven compartment to adapt the latter for baking and roasting and a generally upright position effective to extend the oven compartment downwardly substantially to the level of the burner to adapt the oven compartment for broiling.

4. In an oven structure including a generally rectangular chamber with a gas burner disposed adjacent the bottom of the chamber, a partitioning member supported in said chamber above the burner, said member comprising a generally rectangular metal sheet having flanges extending from the edges at one side and both ends of the sheet, a radiant element mounted on said member with three of its edges substantially abutting said flanges and with one face exposed, the other edge portion of said element extending substantially beyond the corresponding edge of the member, and pivot means supporting said member for movement between a horizontal position presenting the exposed face of said radiant element to the flame produced by the burner and a generally upright position with the extended edge portion of the radiant element presented to the burner flame and the exposed face of the element presented to radiate heat into the chamber.

References Cited in the file of this patent

UNITED STATES PATENTS

| | | |
|---|---|---|
| 521,718 | Koll | June 19, 1894 |
| 1,872,733 | Greenwald | Aug. 23, 1932 |
| 2,219,787 | Parker | Oct. 29, 1940 |
| 2,806,467 | Slaughter | Sept. 17, 1957 |
| 2,848,592 | Mergen | Aug. 19, 1958 |
| 2,931,352 | Edwards | Apr. 5, 1960 |
| 2,944,139 | Harris | July 5, 1960 |